(12) United States Patent
Yun et al.

(10) Patent No.: US 8,498,764 B2
(45) Date of Patent: Jul. 30, 2013

(54) ELECTRIC VEHICLE AND METHOD OF CONTROLLING THE SAME

(75) Inventors: Han-Seok Yun, Yongin-si (KR);
Susumu Segawa, Yongin-si (KR);
Eui-Jeong Hwang, Yongin-si (KR);
Se-Sub Sim, Yongin-si (KR);
Jong-Woon Yang, Yongin-si (KR);
Beom-Gyu Kim, Yongin-si (KR);
Jin-Wan Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 369 days.

(21) Appl. No.: 13/011,769

(22) Filed: Jan. 21, 2011

(65) Prior Publication Data

US 2012/0029744 A1 Feb. 2, 2012

(30) Foreign Application Priority Data

Jul. 28, 2010 (KR) ........................ 10-2010-0072974

(51) Int. Cl.
*G01C 21/34* (2006.01)
*G01C 21/36* (2006.01)

(52) U.S. Cl.
USPC .............................. 701/22; 701/123; 701/410

(58) Field of Classification Search
USPC ........................................................ 701/22
See application file for complete search history.

(56) References Cited

U.S. PATENT DOCUMENTS

| | | | |
|---|---|---|---|
| 5,539,399 A * | 7/1996 | Takahira et al. | 340/995.27 |
| 5,778,326 A * | 7/1998 | Moroto et al. | 701/22 |
| 5,832,396 A * | 11/1998 | Moroto et al. | 701/22 |
| 6,015,021 A | 1/2000 | Tanaka et al. | |
| 7,849,944 B2 * | 12/2010 | DeVault | 180/65.29 |
| 8,229,615 B2 * | 7/2012 | Sakamoto et al. | 701/22 |
| 2003/0006914 A1 * | 1/2003 | Todoriki et al. | 340/995 |
| 2008/0262667 A1 * | 10/2008 | Otabe | 701/22 |
| 2008/0288132 A1 * | 11/2008 | King et al. | 701/22 |
| 2009/0277701 A1 * | 11/2009 | Soma et al. | 180/65.25 |
| 2010/0138098 A1 * | 6/2010 | Takahara et al. | 701/29 |
| 2010/0280687 A1 * | 11/2010 | Tate et al. | 701/22 |
| 2011/0166725 A1 * | 7/2011 | Booth et al. | 701/22 |
| 2011/0288737 A1 * | 11/2011 | Carr | 701/99 |

FOREIGN PATENT DOCUMENTS

| | | |
|---|---|---|
| JP | 10-042401 | 2/1998 |
| JP | 10-059263 | 3/1998 |
| JP | 10-059266 | 3/1998 |

(Continued)

OTHER PUBLICATIONS

Korean Office Action dated Jun. 18, 2012 for Korean Patent Application No. KR 10-2010-0072974 which corresponds to captioned U.S. Appl. No. 13/011,769.

*Primary Examiner* — Shelley Chen
(74) *Attorney, Agent, or Firm* — Knobbe, Martens, Olson & Bear LLP

(57) ABSTRACT

An electric vehicle and a method of controlling the electric vehicle are disclosed. In one embodiment, the electric vehicle includes i) a battery configured to provide electric energy to the motor, ii) a remaining energy-amount detector configured to detect a remaining energy-amount of the battery and iii) a manipulation unit configured to receive target information from a user. The vehicle also includes a guide information generator configured to generate driving guide information based at least in part on the remaining energy-amount of the battery and the target information and a display unit configured to display the driving guide information.

14 Claims, 6 Drawing Sheets

FOREIGN PATENT DOCUMENTS

| | | |
|---|---|---|
| JP | 2004-330944 A | 11/2004 |
| JP | 2009-225564 A | 10/2009 |
| KR | 1019980059245 | 10/1998 |
| KR | 10-0256749 | 2/2000 |
| KR | 10-0262846 B1 | 5/2000 |
| KR | 10-2003-0018867 | 3/2003 |

* cited by examiner

ELECTRIC VEHICLE AND METHOD OF CONTROLLING THE SAME

RELATED APPLICATIONS

This application claims the benefit of Korean Patent Application No. 10-2010-0072974, filed on Jul. 28, 2010, in the Korean Intellectual Property Office, the disclosure of which is incorporated herein in its entirety by reference.

BACKGROUND

1. Field

The described technology generally relates to electric vehicles, and methods of controlling the same.

2. Description of the Related Technology

Recently, as environments have been seriously polluted, attention to green technology has been increased, and many countries, particularly developed ones, recognize that green technology can significantly reduce air pollution and has potential for many commercial applications. Recently, electric bicycles have received attention as one of commercial applications for green technology.

An electric bicycle has wheels which are rotated by a motor. The motor receives electricity from a battery, and thus a capacity of the battery is very important. Recently, along with developments of secondary batteries, capacities of batteries are steadily improving, and governments promote the use of electric bicycles by providing certain benefits, for example, expanding bike lanes. Thus, use of electric bicycles has propagated rapidly.

SUMMARY

One inventive aspect is an electric vehicle for providing optimal driving to a user by using a remaining amount of energy stored in a battery and target information, and method of controlling the same.

Another aspect is an electric vehicle using a motor, the electric vehicle comprising: a battery configured to provide electric energy to the motor; a remaining energy-amount detector configured to detect a remaining energy-amount of the battery; a manipulation unit configured to receive target information from a user; a guide information generator configured to generate driving guide information based at least in part on the remaining energy-amount of the battery and the target information; and a display unit configured to display the driving guide information.

The electric vehicle is configured to operate in an operation mode, and wherein the operation mode is a first mode operated based on the electric energy of the battery or a second mode operated based on the electric energy of the battery and a torque applied by the user. In the above vehicle, the target information comprises at least one of i) a target driving distance defined as a distance in which a user of the electric vehicle wants to drive the electric vehicle and ii) a destination information which is used to calculate a distance between the current location of the user or electric vehicle and the destination.

The above vehicle further comprises a distance calculator configured to calculate a first driving distance in which the electric vehicle operates in the first mode and a second driving distance in which the electric vehicle operates in the second mode, based on the remaining energy-amount of the battery.

In the above vehicle, when the first driving distance is greater than the destination distance or the target driving distance, the guide information generator is configured to generate the first driving distance as the driving guide information, and wherein, when the second driving distance is less than the destination distance or the target driving distance, the guide information generator is configured to generate the second driving distance as the driving guide information.

In the above vehicle, when the destination distance or the target driving distance is greater than or equal to the first driving distance and is less than or equal to the second driving distance, the guide information generator is configured to generate driving distances in which the electric vehicle travels the destination distance or the target driving distance in the first mode and the second mode, as the driving guide information.

The above vehicle further comprises a navigation unit configured to transmit path information based on the destination information to the distance calculator. In the above vehicle, the path information comprises land information, and wherein the distance calculator is configured to calculate the first driving distance and the second driving distance based on the land information. In the above vehicle, the target information comprises a target driving time.

The above vehicle further comprises a time calculator configured to calculate a first driving time during which the electric vehicle operates in the first mode and a second driving time during which the electric vehicle operates in the second mode based on the remaining energy-amount of the battery. In the above vehicle, when the first driving time is greater than the target driving time, the guide information generator is configured to generate the first driving time as the driving guide information, and wherein, when the second driving time is less than the target driving time, the guide information generator is configured to generate the second driving time as the driving guide information.

In the above vehicle, when the target driving time is greater than or equal to the first driving time and is less than or equal to the second driving time, the guide information generator is configured to generate driving times during which the electric vehicle completes the target driving time in the first mode and the second mode, as the driving guide information. The electric vehicle is an electric bicycle.

Another aspect is a method of controlling an electric vehicle: providing an electric vehicle having a first mode operated based on electric energy of a battery and a second mode operated based on i) the electric energy of the battery and ii) a torque applied by a user, wherein the electric vehicle is configured to operate using a motor driven by the electric energy of the battery; detecting a remaining energy-amount of the battery; generating driving guide information based at least in part on the remaining energy-amount of the battery and target information received from the user; and displaying the driving guide information.

The above method further comprises: when destination information or a target driving distance is input as target information, calculating a first driving distance in which the electric vehicle operates in the first mode and a second driving distance in which the electric vehicle operates in the second mode; based on the remaining energy-amount of the battery, and wherein the target driving distance is defined as a distance in which a user of the electric vehicle wants to drive the electric vehicle.

In the above method, the generating comprises: when the first driving distance is greater than a destination distance or the target driving distance, generating the first driving distance as the driving guide information, wherein the destination distance is defined as a distance between the current location of the user or electric vehicle and the destination; and when the second driving distance is less than the destination distance or the target driving distance, generating the second driving distance as the driving guide information.

In the above method, the generating comprises: when a destination distance or the target driving distance is greater than or equal to the first driving distance and is less than or equal to the second driving distance, generating driving distances in which the electric vehicle travels the destination distance or the target driving distance in the first mode and the second mode, as the driving guide information, and wherein the destination distance is defined as a distance between the current location of the user or electric vehicle and the destination.

The above method further comprises: when a target driving time is input as target information, calculating a first driving time during which the electric vehicle operates in the first mode and a second driving time during which the electric vehicle operates in the second mode, based on the remaining energy-amount of the battery. In the above method, the generating comprises: when the first driving time is greater than the target driving time, generating the first driving time as the driving guide information; and when the second driving time is less than the target driving time, generating the second driving time as the driving guide information.

In the above method, the generating comprises: when the target driving time is greater than or equal to the first driving time and is less than or equal to the second driving time, generating driving times during which the electric vehicle completes the target driving time in the first mode and the second mode, as the driving guide information.

Another aspect is an electric vehicle having wheels, comprising: a motor configured to drive at least one of the wheels; a battery configured to provide electric energy to the motor; a residual power detector configured to detect a residual power of the battery; an input unit configured to receive target information; a guide information generator configured to generate driving guide information based at least in part on the residual power of the battery and the target information; and an output unit configured to output the driving guide information.

DETAILED DESCRIPTION

Figure 1:
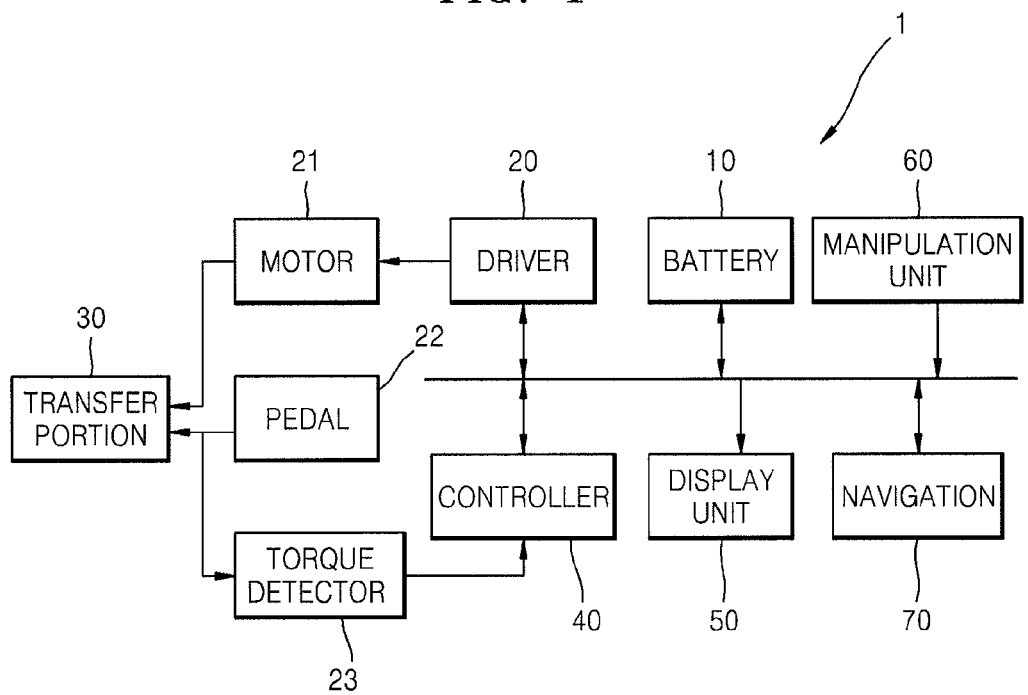
FIG. 1 is a block diagram of an electric vehicle according to an embodiment.

Reference will now be made in detail to embodiments, examples of which are illustrated in the accompanying drawings, wherein like reference numerals refer to the like elements throughout, and thus their description will be omitted.

Also, while describing the embodiments, detailed descriptions about related well-known functions or configurations that may diminish the clarity of the points of the disclosed embodiments are omitted.

Terms or words used herein shall not be limited to having common or dictionary meanings, and have the meanings corresponding to technical aspects of the disclosed embodiments.

Figure 2:
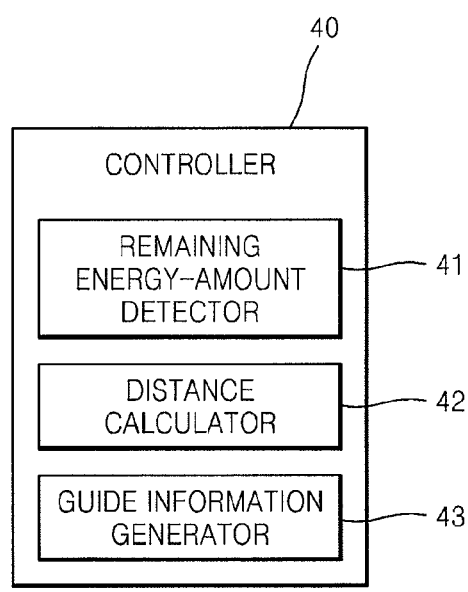
FIG. 2 is a block diagram of a controller of the electric vehicle of FIG. 1 according to an embodiment.

FIG. 1 is a block diagram of an electric vehicle 1 according to an embodiment. FIG. 2 is a block diagram of a controller 40 of the electric vehicle 1 of FIG. 1 according to an embodiment. The electric vehicle may include an electric bicycle, an electric tricycle, a motorcycle, a single wheel vehicle or other electric vehicle which can be operated by a motor and a user.

Referring to FIG. 1, the electric vehicle 1 may include a battery 10, a driver 20, a motor 21, a pedal 22, a torque detector 23, a transfer portion 30, the controller 40, a display unit 50, a manipulation unit 60, and a navigation 70. The electric vehicle 1 may additionally include a speaker which outputs a voice signal indicative of guide information. The speaker may be incorporated into the display unit 50.

The battery 10 may include one or more bare cells, and a protection circuit for controlling charging and discharging of the bare cells. The battery 10 may be a rechargeable secondary battery, and may include a connection terminal for charging the battery 10. The battery 10 stores electric energy by being charged, and provides the stored electric energy to the motor 21.

The driver 20 receives a control signal from the controller 40, generates a driving signal for driving the motor 21, and applies the driving signal to the motor 21. The driving signal may include an electrical signal such as voltage or current and vary according to an operation mode of the electric vehicle 1.

The motor 21 operates the transfer portion 30 according to the driving signal. For example, with regard to an electric bicycle, the motor 21 may rotate wheels according to the driving signal so that the electric bicycle may proceed. The motor 21 receives the electric energy stored in the battery 10 from the battery 10 so as to be driven. The motor 21 is connected directly to the transfer portion 30, which may be a wheel, so as to operate the transfer portion 30. Alternatively, the motor 21 may operate the transfer portion 30 through a chain or a gear.

The pedal 22 transfers power applied by a user to the transfer portion 30. When the pedal 22 performs a rotary motion, a torque applied by the user is transmitted to the transfer portion 30.

The torque detector 23 detects a torque that is applied to the pedal 22 by the user, in real time, and the detected result is applied to the controller 40. Data regarding the detected torque may be used by the controller 40 to calculate an available driving distance in an assist mode.

The transfer portion 30 may move the electric vehicle 1 by using power transferred from the motor 21 or the pedal 22. The transfer portion 30 may be front and rear wheels 31 and 32 (see FIG. 3), tracks, or the like.

The controller 40 may control the entire operation of the electric vehicle 1. In one embodiment, the controller 40 detects a remaining energy-amount (or residual power) of the battery 10, and generates driving guide information, based on the remaining energy-amount of the battery 10 and target information received from the user. In addition, the driving guide information generated by the controller 40 is transmitted to the display unit 50. The target information may be at least one of i) information regarding a distance (target driving distance) that the user wants to drive the electric vehicle 1 (e.g., the user wants to drive 100 miles), ii) destination information which can be used to calculate a destination distance between the current location of the user or vehicle and the destination.

The electric vehicle 1 has a plurality of operation modes, and may operate in any one of the operation modes. For example, the electric vehicle 1 may have i) an auto mode in which the electric vehicle 1 operates based on only the electric energy stored in the battery 10, and ii) an assist mode in which the electric vehicle 1 operates based on the combination of the electric energy stored in the battery 10 and a torque applied by the user. In addition, the electric vehicle 1 may have a manual mode in which the electric vehicle 1 operates based on only a torque applied by the user.

Referring to FIG. 2, the controller 40 may include a remaining energy-amount detector 41, a distance calculator 42, and a guide information generator 43.

The remaining energy-amount detector 41 monitors a voltage or current output from the battery 10 so as to detect the remaining energy-amount of the battery 10. The remaining energy-amount detector 41 transmits data regarding the remaining energy-amount of the battery 10 to the distance calculator 42.

The distance calculator 42 calculates an expected driving distance that the electric vehicle 1 is able to be driven, based on the remaining energy-amount of the battery 10. In this case, the electric vehicle 1 may have the auto mode and the assist mode in which the electric vehicle 1 operates based on the electric energy stored in the battery 10. Thus, the distance calculator 42 calculates an expected driving distance in the auto mode and an expected driving distance in the assist mode.

When the electric vehicle 1 operates in the auto mode, since only the electric energy stored in the battery 10 is used, the distance calculator 42 considers only the remaining energy-amount of the battery 10 in order to calculate the expected driving distance in the auto mode. On the other hand, when the electric vehicle 1 operates in the assist mode, since a torque applied by the user as well as the electric energy stored in the battery 10 may be used, data regarding the torque transmitted by the torque detector 23 may be reflected in calculating the expected driving distance in the assist mode. In one embodiment, the torque is an expected average torque measured based on the fact that the current torque is substantially constantly applied until the electric vehicle 1 arrives at the destination. Alternatively, real time torque may be considered so that the expected driving distance in the assist mode is constantly or frequently updated.

The guide information generator 43 generates the driving guide information by using the remaining energy-amount of the battery 10 and the target information. In one embodiment, the guide information generator 43 receives the expected driving distance in each of the auto and assist modes calculated by the distance calculator 42, compares the expected driving distance in each operation mode with the target information, and generates the driving guide information. The driving guide information may include an optimum route calculated based on the remaining energy-amount of the battery 10 and the target information input by the user.

The driving guide information may be generated according to the target information input by the user. In one embodiment, when the user supplies a minimal amount of power for driving the electric vehicle 1, the electric vehicle 1 is optimally driven. Thus, the user may be guided to operate the electric vehicle 1 in the auto mode if possible, based on the target information input by the user.

When a distance between a starting point and a destination and the target driving distance are collectively referred to as a target distance Dt, the guide information generator 43 compares the target distance Dt with an available driving distance in the auto mode and an available driving distance in the assist mode, and generates the driving guide information, based on the comparing result.

For example, when the target distance Dt is smaller than or equal to the available driving distance in the auto mode, the electric vehicle 1 may travel a distance that the user wants to drive in the auto mode using only the electric energy stored in the battery 10. Thus, the guide information generator 43 generates the available driving distance in the auto mode as the driving guide information, and transmits the available driving distance in the auto mode to the display unit 50. That is, the user is notified that the electric vehicle 1 may travel the distance between the starting point and the destination or the target driving distance.

When the target distance Dt is greater than the available driving distance in the assist mode, the electric vehicle 1 may not travel the distance that the user wants to drive in the assist mode using only the electric energy stored in the battery 10. Thus, the guide information generator 43 generates the available driving distance in the assist mode as the driving guide information, and transmits the available driving distance in the assist mode to the display unit 50. That is, the user is notified about the maximum distance that the electric vehicle 1 is able to operate without operating in the manual mode.

When the target distance Dt is greater than the available driving distance in the auto mode and is smaller than or equal to the available driving distance in the assist mode, if the electric vehicle 1 operates only in the auto mode, the electric vehicle 1 may not travel the distance between the starting point and the destination or the target driving distance. However, if the electric vehicle 1 may operate in the assist mode, the electric vehicle 1 may travel the distance between the starting point and the destination or the target driving distance. Thus, the guide information generator 43 generates a driving method for optimally travelling the target distance Dt for the user, based on the remaining energy-amount of the battery 10 and the target information. That is, the guide information generator 43 calculates a driving distance that the electric vehicle 1 is to operate in the auto mode and a driving distance that the electric vehicle 1 is to operate in the assist mode, in order to optimally travel the target distance Dt. The guide information generator 43 uses the driving distance that the electric vehicle 1 is to operate in each operation mode, as the driving guide information.

The display unit 50 displays the driving guide information transmitted from the controller 40, to the user. The display unit 50 may include a display panel such as a liquid crystal display (LCD), or an organic light emitting display (OLED), and a driver thereof. In addition, when the navigation 70 to be described later is installed in the electric vehicle 1, the display unit 50 may receive map data and location information from the navigation 70, and may display a map and the current location of the electric vehicle 1.

The manipulation unit 60 may apply a manipulation signal to the controller 40 according to a user's input. The user may input the target information, for example, information regarding a destination or a location, or the target driving distance that the user wants to drive, by using the manipulation unit 60.

The navigation 70 including a global positioning system (GPS) installed therein may automatically display its current location. The navigation 70 may store a map in an internal memory, or the like, so as to provide the map to the display unit 50. In addition, when the information regarding the destination is input to the navigation 70 by the user, the navigation 70 may search for path information for the destination, and may transmit the found path information to the distance calculator 42. In this case, the path information may be information regarding a path along which the electric vehicle 1 may move optimally. In addition, the path information may include land information indicating a slope, etc., contained in a path as well as information regarding a simple path. In this case, when the distance calculator 42 calculates the expected driving distance in each operation mode, the path information, the land information, or the like may be reflected.

Figure 3:
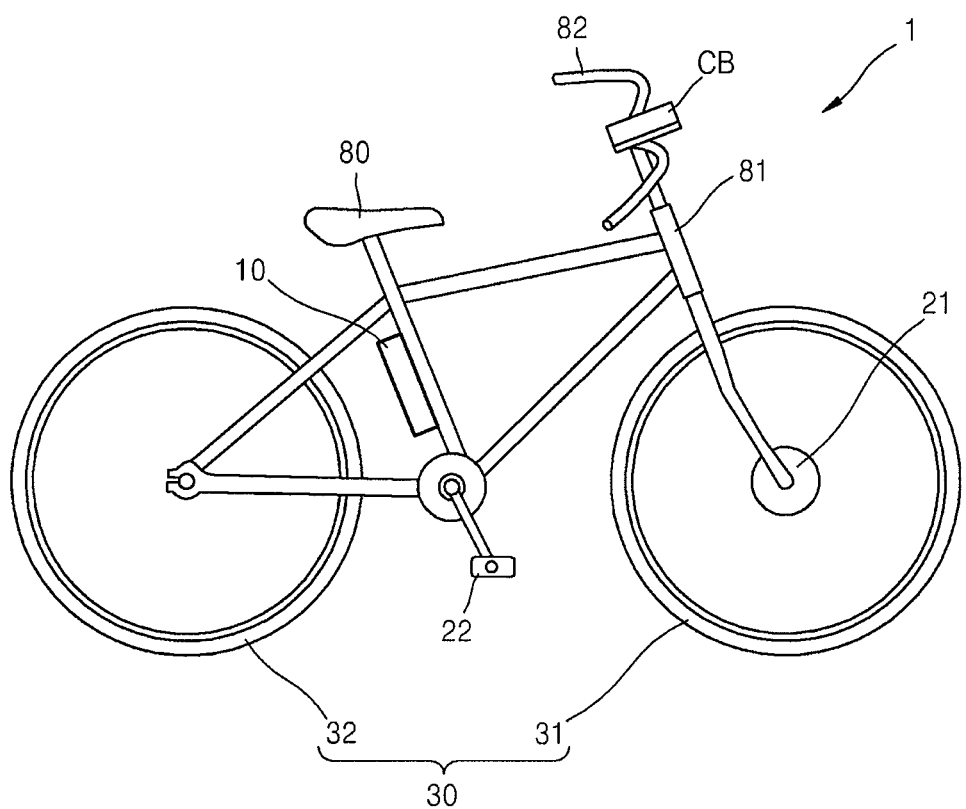
FIG. 3 is a diagram of the electric vehicle of FIG. 1.

FIG. 3 is a diagram of the electric vehicle 1 of FIG. 1. Referring to FIG. 3, an electric bicycle is shown as the electric vehicle 1. In the electric bicycle, a frame 81 may support each element installed in the electric bicycle, may function as a whole frame, and may regularly apply a user's weight to the transfer portion 30.

In one embodiment, the front and rear wheels 31 and 32 as the transfer portion 30 are connected to the frame 81, and the motor 21 for operating the electric bicycle by using electric energy is installed near the front wheel 31. The battery 10 is also connected to the frame 81, and is electrically connected to the motor 21 and the driver 20. In another embodiment, the battery, CB (will be described below) and motor can be located in other areas of the electric bicycle. For example, the motor 21 may be located at or near the rear wheel 32.

The pedal 22 is installed at a portion of the frame 81. When the user rotates the pedal 22 by applying power to the pedal 22, the power applied by the user is transmitted to the front wheel 31 or the rear wheel 32 through a gear, a chain, or the like.

A saddle 80 for the user to ride on, and a handle 82 for determining a driving direction of the electric bicycle and supporting a user's body are installed at portions of the frame 81.

A control box CB may be installed at a portion of the frame 81. The control box CB may include the display unit 50 for displaying the driving guide information to the user, the manipulation unit (input unit) 60 for inputting the user's manipulation (input) signal, and the navigation 70. The control box CB may be installed at a location in which the user may easily check the driving guide information, for example, in a central portion of the handle 82.

Hereinafter, a method of controlling the electric vehicle 1 will be described.

Figure 4:
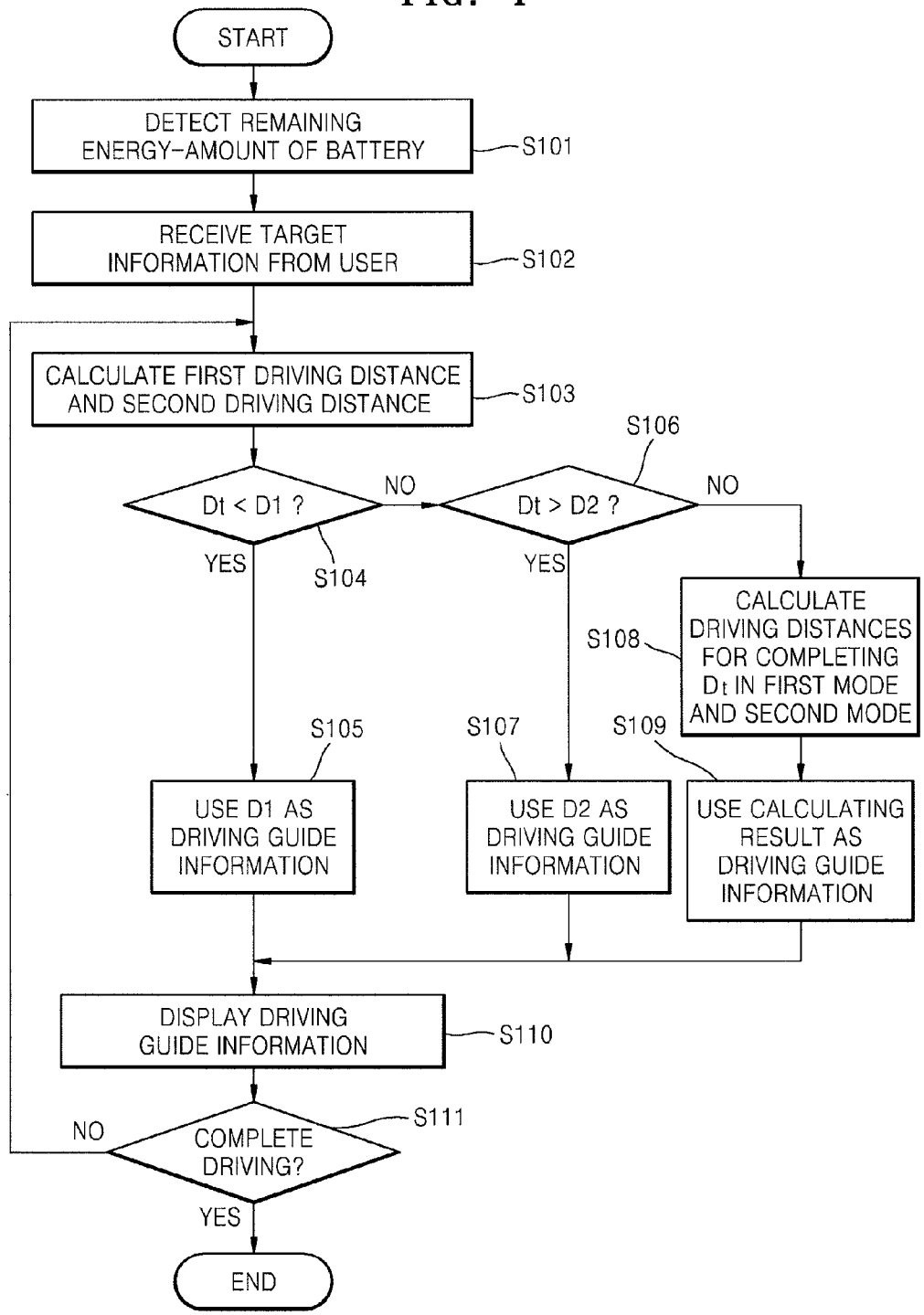
FIG. 4 is a flowchart of a method of controlling the electric vehicle of FIG. 1 according to an embodiment.

FIG. 4 is a flowchart of a method of controlling the electric vehicle 1 according to an embodiment. Depending on the embodiment, certain states of FIG. 4 may be combined, omitted or changed in order. Also, additional states may be added. This applies to the FIG. 8 embodiment. Referring to FIG. 4, the remaining energy-amount detector 41 detects the remaining energy-amount of the battery 10 (operation S101), and receives target information (as described above) from the user (operation S102). In one embodiment, when the target information is the destination information, the navigation 70 searches for a path corresponding to the destination, and receives path information generated by searching for the path.

The distance calculator 42 calculates an available driving distance in each operation mode, based on the remaining energy-amount of the battery 10 and the target information (operation S103). For example, when the electric vehicle 1 operates in the auto mode, a first driving distance D1 as the available driving distance in the auto mode and a second driving distance D2 as the available driving distance in the assist mode are each calculated.

The first driving distance D1 and the second driving distance D2 are compared with a target distance Dt based on the target information (operations S104 and S106). When the destination information is input as the target information, a distance between a starting point (or the current location of the user or electric vehicle) and the destination measured from information corresponding to the path for the destination, is set as the target distance Dt, and then the target distance Dt is compared with the first driving distance D1 and the second driving distance D2. On the other hand, when the target driving distance is input as the target information, the target driving distance is set as the target distance Dt, and then the target driving distance is compared with the first driving distance D1 and the second driving distance D2.

When the target distance Dt is smaller than the first driving distance D1, the electric vehicle 1 may travel a distance that the user wants to drive in the auto mode using only the electric energy stored in the battery 10. Thus, the guide information generator 43 uses the first driving distance D1 as guide information (operation S105). In one embodiment, the user is notified that the electric vehicle 1 may travel the distance between the starting point and the destination or the target driving distance.

When the target distance Dt is greater than the second driving distance D2, the electric vehicle 1 may not travel the distance that the user wants to drive in the assist mode using only the electric energy. Thus, the guide information generator 43 uses the second driving distance D2 as the guide information (operation S107). In one embodiment, the user is notified about the maximum distance that the electric vehicle 1 is able to operate without operating in the manual mode.

When the target distance Dt is greater than or equal to the first driving distance D1 and smaller than or equal to the second driving distance D2, if the electric vehicle 11 operates only in the auto mode, the electric vehicle 1 may not travel the distance between the starting point and the destination or the target driving distance. However, if the electric vehicle 1 may operate in the assist mode, the electric vehicle 1 may travel the distance between the starting point and the destination or the target driving distance. Thus, the guide information generator 43 generates a driving method for optimally completing the target distance Dt for the user, based on the remaining energy-amount of the battery 10 and the target information (operation S108). That is, the guide information generator 43 calculates a driving distance that the electric vehicle 1 is to operate in the auto mode and a driving distance that the electric vehicle 1 is to operate in the auto mode, in order to optimally travel the target distance Dt. In this case, each driving distance may be calculated so that the driving distance that the electric vehicle 1 is to operate in the auto mode may be maximized in order to minimize power applied by the user. The guide information generator 43 uses the driving distance that the electric vehicle 1 is to operate in each operation mode, as the driving guide information (operation S109).

The driving guide information is transmitted to the display unit 50, and the display unit 50 displays the driving guide information (operation S110).

Figure 5:
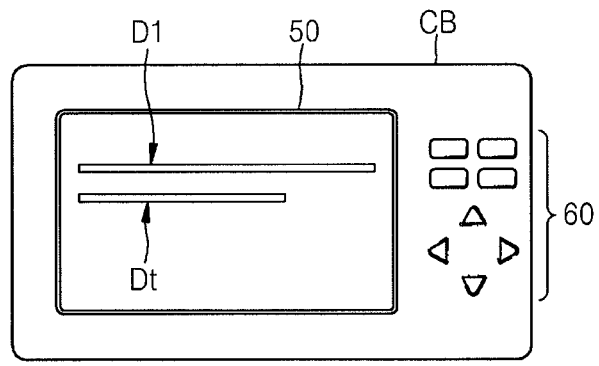
FIG. 5 is a diagram for explaining driving guide information displayed on the electric vehicle of FIG. 1 according to an embodiment.

It is determined whether driving is completed (operation S111). When the driving is not completed, the method returns to operation S103, and operations S103 through S110 are performed again. According to the present embodiment, the method returns to operation S103 but the present embodiment is not limited thereto. For example, new target information may be input by the user. In this case, the method may return to operation S101 or S102. FIG. 5 is a diagram for explaining driving guide information displayed on the electric vehicle 1 of FIG. 1 according to an embodiment of the present invention.

Referring to FIG. 5, a target driving distance is input as target information. The display unit 50 and the manipulation unit 60 are installed in the control box CB. The driving guide information is displayed on the display unit 50.

In the FIG. 5 embodiment, the electric vehicle 1 may travel the target distance Dt. An available driving distance in an auto mode, that is, D1, is displayed as the driving guide information. In addition, by substantially simultaneously displaying the target distance Dt, a user may intuitively check the remaining energy-amount of the battery 10 with respect to the target distance Dt.

Figure 6:
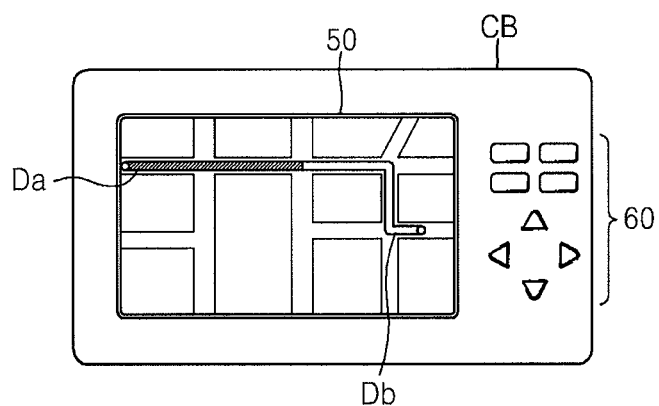
FIG. 6 is a diagram for explaining driving guide information displayed on the electric vehicle of FIG. 1 according to another embodiment.

FIG. 6 is a diagram for explaining driving guide information displayed on the electric vehicle 1 of FIG. 1 according to another embodiment.

Referring to FIG. 6, destination information is input as target information. The display unit 50 may display the current location of the electric vehicle 1, or a path between a start point and a destination, together with a map.

In the FIG. 6 embodiment, the electric vehicle 1 may not travel the target distance Dt only in the auto mode. Thus, the guide information generator 43 calculates a driving distance Da that the electric vehicle 1 is to operate in the auto mode, and a driving distance Db that the electric vehicle 1 is to operate in the assist mode, in order to optimally travel the target distance Dt. The display unit 50 displays the calculated result on a path, and thus distances that the electric vehicle 1 is to operate in the auto mode and the assist mode may be adjusted.

Figure 7:
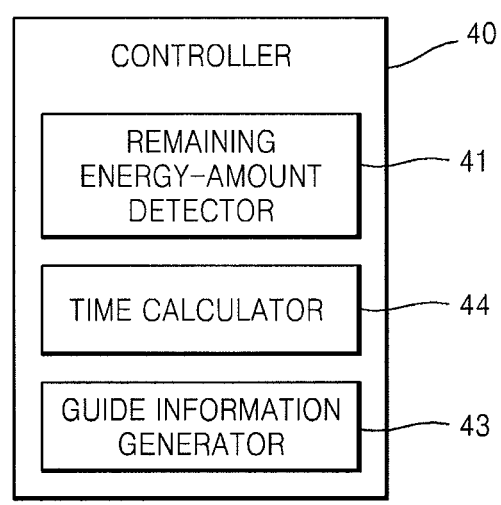
FIG. 7 is a block diagram of a controller of an electric vehicle according to another embodiment.

FIG. 7 is a block diagram of the controller 40 of the electric vehicle 1 according to another embodiment. The controller 40 of FIG. 7 is the same as the above-described embodiment, except that the controller 40 includes a time calculator 44, instead of the distance calculator 42, and thus the controller 40 of Although not shown, the controller 40 may include both the distance calculator 42 and the time calculator 44. FIG. 7 will be described in terms of differences from the above-described embodiment.

The electric vehicle 1 according to the present embodiment receives a target driving time as target information from a user. That is, the user inputs the target driving time that the user wants to drive, to the electric vehicle 1 by using the manipulation unit 60.

The controller 40 of the electric vehicle 1 may include the remaining energy-amount detector 41, the time calculator 44, and the guide information generator 43.

The remaining energy-amount detector 41 detects the remaining energy-amount of the battery 10, like in FIG. 2. The remaining energy-amount detector 41 transmits data regarding the remaining energy-amount of the battery 10 to the time calculator 44.

The time calculator 44 calculates expected driving times for both the auto mode and the assist mode, by using the remaining energy-amount of the battery 10. The expected driving times may be separately calculated depending on whether there is a normal traffic (e.g., non-rush hour) or a heavy traffic (e.g., rush-hour).

When the electric vehicle 1 operates in the auto mode, since only the electric energy stored in the battery 10 is used, the time calculator 44 considers only the remaining energy-amount of the battery 10 in order to calculate the expected driving time in the auto mode. On the other hand, the electric vehicle 1 operates in the assist mode, since a torque applied by the user as well as the electric energy stored in the battery 10 may be used, data regarding the torque transmitted by the torque detector 23 may be reflected in calculating the expected driving time in the assist mode.

The guide information generator 43 generates the driving guide information by using the remaining energy-amount of the battery 10 and the target information. In detail, the guide information generator 43 receives each expected driving time calculated by the time calculator 44, compares the expected driving times with the target information, and generates the driving guide information.

A method of generating the driving guide information when the target driving time is input as the target information is materially the same as in a case when the destination information or the target driving distance is input as the target information, and thus the detailed description of the method will not be described herein.

Figure 8:
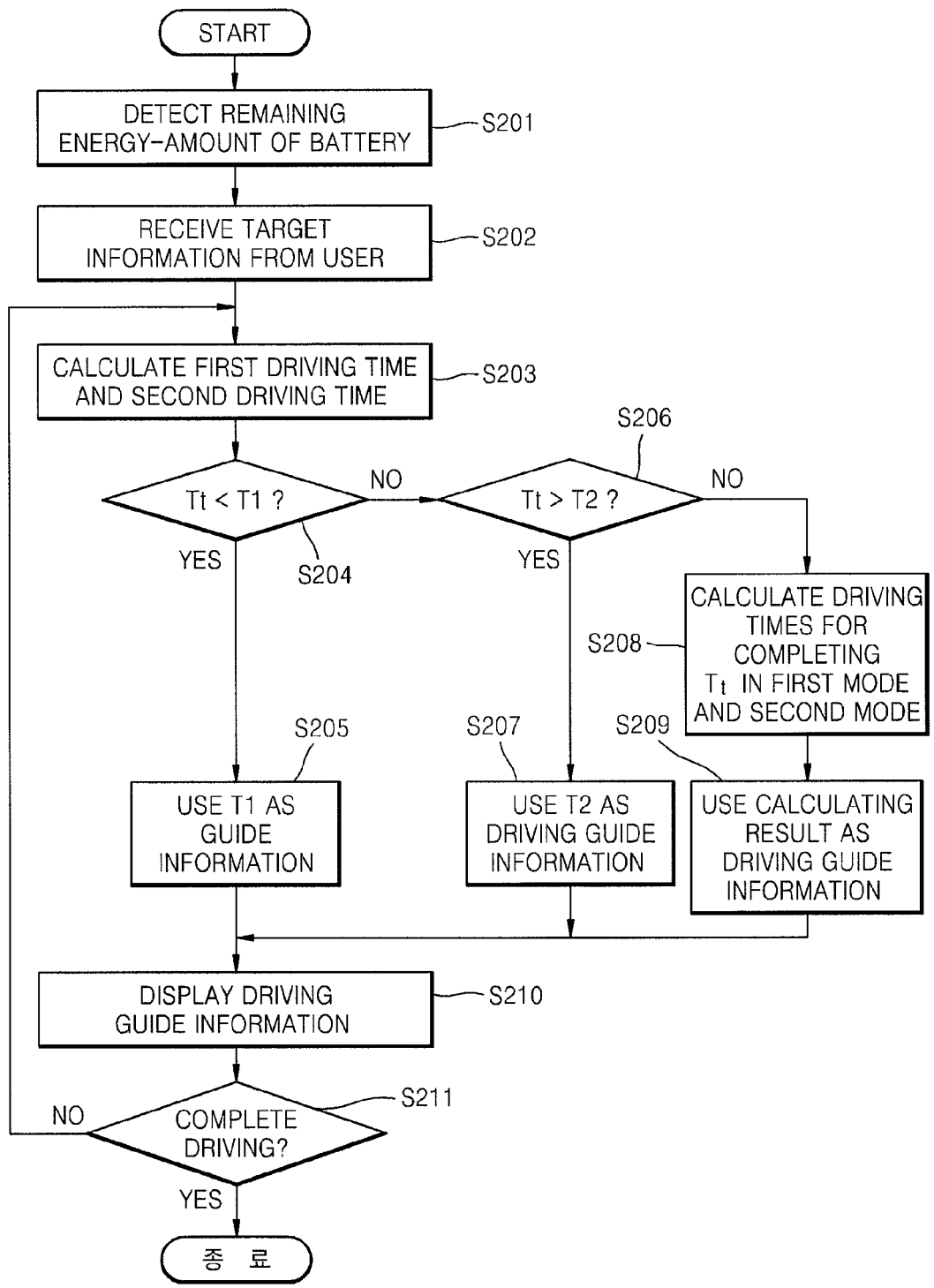
FIG. 8 is a flowchart of a method of controlling an electric vehicle according to another embodiment.

FIG. 8 is a flowchart of a method of controlling the electric vehicle 1, according to another embodiment. Referring to FIG. 8, the remaining energy-amount detector 41 detects the remaining energy-amount of the battery 10 (operation S201), and receives a target driving time as target information from the user (operation S202).

The time calculator 44 calculates a first driving time T1 that is an available driving time in the auto mode and a second driving time T2 that is an available driving time in the assist mode, by using the remaining energy-amount of the battery 10 and the target information (operation S203).

The first driving time T1 and the second driving time T2 are compared with a target time Tt based on the target information (operations S204 and S206). In addition, the driving guide information is generated according to the comparing result (operations S205, S207, S208, and S209). A method of generating the driving guide information is materially the same as the method of generating the driving guide information of FIG. 4, and thus will not be described in detail.

The driving guide information is transmitted to the display unit 50, and the display unit 50 displays the driving guide information (operation S210).

It is determined whether driving is completed (operation S211). When the driving is not completed, the method returns to operation S203, and operations S203 through S210 are performed again. According to the present embodiment, the method returns to operation S203 but the present embodiment is not limited thereto. For example, new target information may be input by the user. In this case, the method may return to operation S201 or S202.

Figure 9:
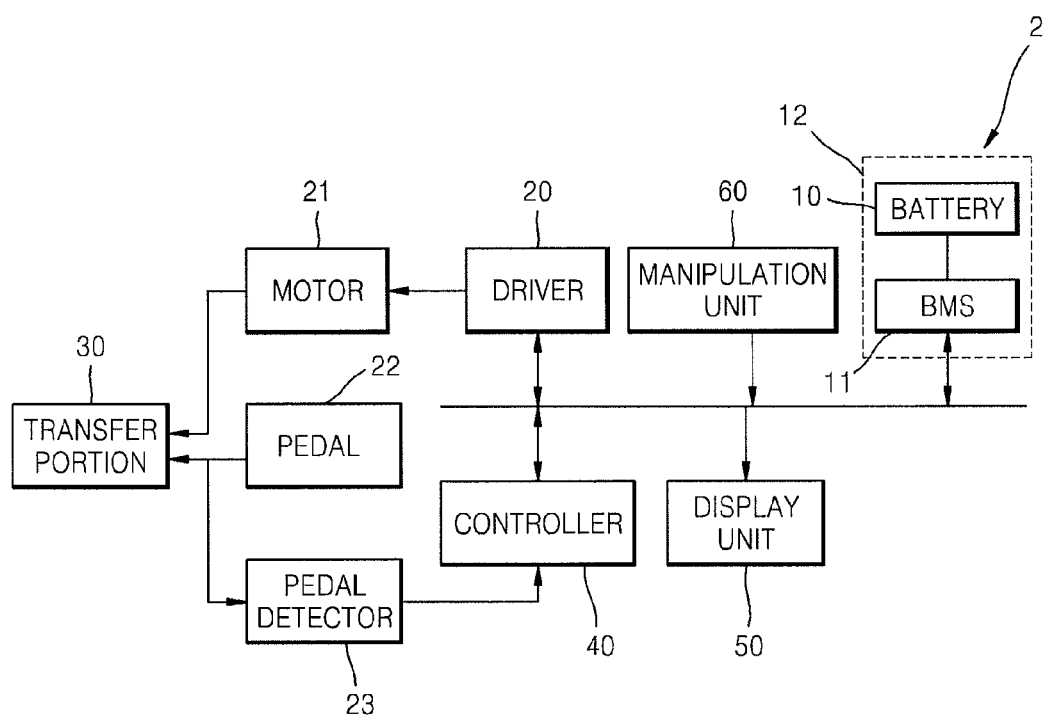
FIG. 9 is a block diagram of an electric vehicle according to another embodiment.

FIG. 9 is a block diagram of an electric vehicle 2 according to another embodiment. The electric vehicle 2 of FIG. 9 has a construction and function similar to those of the electric vehicle 1 of FIG. 1, and thus will be described in terms of differences from the electric vehicle 1 of FIG. 1.

The electric vehicle 2 may include a battery pack 12 in which the battery 10 and a battery management system (BMS) 11 are integrated with each other.

The BMS 11 is connected to the battery 10 so as to control charging and discharging operations of battery 10. The BMS 11 may perform an overcharging protection function, an over-discharging protection function, an overcurrent protection function, an overvoltage protection function, an overheat protection function, a cell balancing function, or the like, in order to protect the battery 10. To this end, the BMS 11 may monitor a voltage, current, temperature, remaining energy-amount, lifetime, charging state, or the like of the battery 10, and may transmit related information to the controller 40. That is, the BMS 11 may function as the remaining energy-amount detector 41.

The controller 40 receives data regarding the remaining energy-amount of the battery 10, from the BMS 11, and generates the driving guide information by using the data.

The electric vehicles 1 and 2 according to at least one of the disclosed embodiments may provide an optimal driving method based on the remaining energy-amount of a battery and target information.

A program for executing the method of controlling the electric vehicle 1 or 2 may be stored in a recording medium. The recording medium may be a processor readable medium such as a semiconductor recording medium (e.g., a flash medium). The recording medium may be read by a processor, and the program may be executed by the processor.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An electric vehicle using a motor, the electric vehicle comprising:
    a battery configured to provide electric energy to the motor;
    a remaining energy-amount detector configured to detect a remaining energy-amount of the battery;
    a manipulation unit configured to receive target information from a user, wherein the target information comprises at least one of i) a target driving distance defined as a distance in which a user of the electric vehicle wants to drive the electric vehicle and ii) a destination information which is used to calculate a destination distance between the current location of the user or electric vehicle and the destination;
    a guide information generator configured to generate driving guide information based at least in part on the remaining energy-amount of the battery and the target information; and
    a display unit configured to display the driving guide information, wherein the electric vehicle is configured to operate in an operation mode, and wherein the operation mode is a first mode operated based on the electric energy of the battery or a second mode operated based on the electric energy of the battery and a torque applied by the user; and
    a distance calculator configured to calculate a first driving distance in which the electric vehicle operates in the first mode and a second driving distance in which the electric vehicle operates in the second mode, based on the remaining energy-amount of the battery,
    wherein, when the first driving distance is greater than the destination distance or the target driving distance, the guide information generator is configured to generate the first driving distance as the driving guide information, and
    wherein, when the second driving distance is less than the destination distance or the target driving distance, the guide information generator is configured to generate the second driving distance as the driving guide information.

2. The electric vehicle of claim 1, wherein, when the destination distance or the target driving distance is greater than or equal to the first driving distance and is less than or equal to the second driving distance, the guide information generator is configured to generate driving distances in which the electric vehicle travels the destination distance or the target driving distance in the first mode and the second mode, as the driving guide information.

3. The electric vehicle of claim 1, further comprising a navigation unit configured to transmit path information based on the destination information to the distance calculator.

4. The electric vehicle of claim 3, wherein the path information comprises land information, and wherein the distance calculator is configured to calculate the first driving distance and the second driving distance based on the land information.

5. The electric vehicle of claim 1, wherein the target information comprises a target driving time.

6. The electric vehicle of claim 5, further comprising a time calculator configured to calculate a first driving time during which the electric vehicle operates in the first mode and a second driving time during which the electric vehicle operates in the second mode based on the remaining energy-amount of the battery.

7. The electric vehicle of claim 6, wherein, when the first driving time is greater than the target driving time, the guide information generator is configured to generate the first driving time as the driving guide information, and
    wherein, when the second driving time is less than the target driving time, the guide information generator is configured to generate the second driving time as the driving guide information.

8. The electric vehicle of claim 6, wherein, when the target driving time is greater than or equal to the first driving time and is less than or equal to the second driving time, the guide information generator is configured to generate driving times during which the electric vehicle completes the target driving time in the first mode and the second mode, as the driving guide information.

9. A method of controlling an electric vehicle:
    providing an electric vehicle having a first mode operated based on electric energy of a battery and a second mode operated based on i) the electric energy of the battery and ii) a torque applied by a user, wherein the electric vehicle is configured to operate using a motor driven by the electric energy of the battery;
    detecting a remaining energy-amount of the battery;
    generating driving guide information based at least in part on the remaining energy-amount of the battery and target information received from the user, said generating driving guide information comprising generating the first driving distance as the driving guide information, wherein the destination distance is defined as a distance between the current location of the user or electric vehicle and the destination when the first driving distance is greater than a destination distance or the target driving distance, and generating the second driving distance as the driving guide information when the second driving distance is less than the destination distance or the target driving distance; and
    calculating a first driving distance in which the electric vehicle operates in the first mode and a second driving distance in which the electric vehicle operates in the second mode, based on the remaining energy-amount of the battery when destination information or a target driving distance is input as target information, and wherein the target driving distance is defined as a distance in which a user of the electric vehicle wants to drive the electric vehicle; and
    displaying the driving guide information.

10. The method of claim 9, wherein the generating comprises: when a destination distance or the target driving distance is greater than or equal to the first driving distance and is less than or equal to the second driving distance, generating driving distances in which the electric vehicle travels the destination distance or the target driving distance in the first mode and the second mode, as the driving guide information, and wherein the destination distance is defined as a distance between the current location of the user or electric vehicle and the destination.

11. The method of claim 9, further comprising: when a target driving time is input as target information, calculating a first driving time during which the electric vehicle operates in the first mode and a second driving time during which the electric vehicle operates in the second mode, based on the remaining energy-amount of the battery.

12. The method of claim 11, wherein the generating comprises: when the first driving time is greater than the target driving time, generating the first driving time as the driving guide information; and when the second driving time is less than the target driving time, generating the second driving time as the driving guide information.

13. The method of claim 11, wherein the generating comprises: when the target driving time is greater than or equal to the first driving time and is less than or equal to the second driving time, generating driving times during which the electric vehicle completes the target driving time in the first mode and the second mode, as the driving guide information.

14. An electric vehicle having wheels, comprising:
a motor configured to drive at least one of the wheels;
a battery configured to provide electric energy to the motor;
a residual power detector configured to detect a residual power of the battery;
an input unit configured to receive target information, wherein the target information comprises at least one of i) a target driving distance defined as a distance in which a user of the electric vehicle wants to drive the electric vehicle and ii) a destination information which is used to calculate a destination distance between the current location of the user or electric vehicle and the destination;
a guide information generator configured to generate driving guide information based at least in part on the residual power of the battery and the target information; and
an output unit configured to output the driving guide information, wherein the electric vehicle is configured to operate in an operation mode, and wherein the operation mode is a first mode operated based on the electric energy of the battery or a second mode operated based on the electric energy of the battery and a torque applied by the user; and
a distance calculator configured to calculate a first driving distance in which the electric vehicle operates in the first mode and a second driving distance in which the electric vehicle operates in the second mode, based on the residual power of the battery,
wherein, when the first driving distance is greater than the destination distance or the target driving distance, the guide information generator is configured to generate the first driving distance as the driving guide information, and
wherein, when the second driving distance is less than the destination distance or the target driving distance, the guide information generator is configured to generate the second driving distance as the driving guide information.

* * * * *